(12) United States Patent
Malm et al.

(10) Patent No.: US 8,713,935 B2
(45) Date of Patent: May 6, 2014

(54) CARBURETED NATURAL GAS TURBO CHARGED ENGINE

(75) Inventors: Howard Leigh Malm, Coquitlam (CA); Wade Larry Mowat, New Norway, CA (US)

(73) Assignee: REM Technology, Inc., Calgary, Alberta (CA)

( * ) Notice: Subject to any disclaimer, the term of this patent is extended or adjusted under 35 U.S.C. 154(b) by 0 days.

(21) Appl. No.: 12/970,558

(22) Filed: Dec. 16, 2010

(65) Prior Publication Data
US 2011/0174281 A1    Jul. 21, 2011

Related U.S. Application Data

(62) Division of application No. 11/421,550, filed on Jun. 1, 2006, now Pat. No. 7,861,697.

(51) Int. Cl.
| | | |
|---|---|---|
| *F02D 23/00* | (2006.01) |
| *F02D 41/00* | (2006.01) |
| *F02M 7/24* | (2006.01) |
| *F02B 43/00* | (2006.01) |
| *F02M 3/00* | (2006.01) |
| *F02M 51/00* | (2006.01) |
| *F02B 37/18* | (2006.01) |
| *F02D 19/02* | (2006.01) |
| *F02M 13/08* | (2006.01) |
| *F02M 21/02* | (2006.01) |
| *F02M 21/04* | (2006.01) |
| *F02D 41/14* | (2006.01) |

(52) U.S. Cl.
CPC ............ *F02B 37/18* (2013.01); *F02B 37/186* (2013.01); *F02D 19/023* (2013.01); *F02D 19/029* (2013.01); *F02M 13/08* (2013.01); *F02M 21/02* (2013.01); *F02M 21/04* (2013.01); *F02M 21/0215* (2013.01); *F02M 21/0203* (2013.01); *F02D 2041/1409* (2013.01); *F02D 2041/141* (2013.01); *F02D 41/1477* (2013.01); *Y02T 10/144* (2013.01); *Y02T 10/32* (2013.01)

USPC ............... 60/602; 60/601; 123/703; 123/438; 123/528; 123/527; 123/339.21; 123/683; 123/684; 123/478

(58) Field of Classification Search
CPC ...... F02B 37/18; F02B 37/186; F02D 19/023; F02D 19/029; F02D 2041/1409; F02D 2041/141; F02D 41/1477; F02M 13/08; F02M 21/02; F02M 21/04; F02M 21/0215; F02M 21/0203; Y02T 10/144; Y02T 10/32
USPC ............ 123/361, 571, 198 D, 399, 352–355, 123/478, 527–528, 683–684, 335, 703, 438, 123/339.21; 60/602
See application file for complete search history.

(56) References Cited

U.S. PATENT DOCUMENTS

| | | | | |
|---|---|---|---|---|
| 2,559,859 A | * | 7/1951 | Elliott et al. | 123/406.69 |
| 3,575,256 A | * | 4/1971 | Jania et al. | 123/361 |

(Continued)

FOREIGN PATENT DOCUMENTS

| | | | | | |
|---|---|---|---|---|---|
| CN | 101173642 A | * | 5/2008 | | F02M 7/18 |
| JP | 63085221 A | * | 4/1988 | | F02B 33/00 |

(Continued)

*Primary Examiner* — Thai Ba Trieu
(74) *Attorney, Agent, or Firm* — John Russell Uren

(57) ABSTRACT

A control system for a turbo charged natural gas engine. A butterfly valve used for fuel control upstream of a carburetor provides non-linear flow response during opening and closing and a flow compensator compensates for the non-linear response. A throttle valve position sensor acts in association with a controller which compares the throttle valve position signal with a predetermined set point and thereby opens or closes the waste gate of the turbo charger which affects oxygen content in the exhaust. A compensator for a throttle valve used with electronic engine controllers is also provided.

2 Claims, 6 Drawing Sheets

(56) References Cited

U.S. PATENT DOCUMENTS

| | | | |
|---|---|---|---|
| 4,205,377 A * | 5/1980 | Oyama et al. | 701/108 |
| 4,416,115 A * | 11/1983 | Iida | 60/600 |
| 4,418,673 A * | 12/1983 | Tominari et al. | 123/399 |
| 4,442,820 A * | 4/1984 | Ina et al. | 701/108 |
| 4,445,489 A * | 5/1984 | Kobayashi et al. | 123/682 |
| 4,474,161 A * | 10/1984 | Knapp et al. | 123/478 |
| 5,443,558 A * | 8/1995 | Ibaraki et al. | 123/325 |
| 5,645,033 A * | 7/1997 | Person et al. | 123/399 |
| 5,832,896 A * | 11/1998 | Phipps | 123/352 |
| 6,199,537 B1 * | 3/2001 | Kowatari et al. | 123/399 |
| 6,202,629 B1 * | 3/2001 | Zhu et al. | 123/352 |
| 6,226,981 B1 * | 5/2001 | Bruch et al. | 123/478 |
| 6,386,182 B2 * | 5/2002 | Kowatari et al. | 123/399 |
| 6,457,467 B1 * | 10/2002 | O'Neill et al. | 123/527 |
| 6,915,777 B2 * | 7/2005 | Fukushima et al. | 123/335 |
| 7,082,924 B1 * | 8/2006 | Ruedin | 123/352 |
| 7,861,697 B2 * | 1/2011 | Malm et al. | 123/528 |
| 8,005,603 B2 * | 8/2011 | Fisher et al. | 123/527 |
| 2003/0056753 A1 * | 3/2003 | Fukushima et al. | 123/335 |
| 2011/0099997 A1 * | 5/2011 | Singh et al. | 60/602 |
| 2013/0014732 A1 * | 1/2013 | Dasappa et al. | 123/527 |

FOREIGN PATENT DOCUMENTS

| | | | | |
|---|---|---|---|---|
| JP | 63113140 A | * | 5/1988 | F02D 41/12 |
| JP | 02136530 A | * | 5/1990 | F02D 41/04 |
| JP | 02308936 A | * | 12/1990 | F02D 41/04 |

* cited by examiner

CARBURETED NATURAL GAS TURBO CHARGED ENGINE

This invention relates to a control system for a carbureted natural gas engine and, more particularly, to an improved control system for air/fuel ratio and for the governor of a natural gas carbureted turbo charged engine.

BACKGROUND OF THE INVENTION

Natural gas powered engines are used pervasively for various applications and are particularly used in association with gas compression and electric power generation. Many of these engines are generally smaller type engines typically in the range of 200 HP to 800 HP. These existing engines have certain disadvantages including relatively high exhaust emissions which typically contain nitrogen oxides also known as NOx. In many jurisdictions, regulations place an upper limit on the nitrogen oxide emissions; hence the engines require technology to limit and control these emissions. These engines often are turbo charged and waste gates used with the turbo charger on such engines are typically controlled only by the turbo charger compressor pressure and therefore serve only to limit the maximum turbo charger pressure output. The costs of operation of these engines together with the cost of existing control systems are relatively high. It would be advantageous to provide a control system for less cost and which control system would increase engine efficiency, reduce nitrogen oxides emissions and reduce engine exhaust temperatures by providing increased or otherwise appropriately controlled air with the fuel for increased efficiency in combustion.

The replacement of the existing control systems on natural gas engines is difficult. It would further be advantageous to install an improved control system on existing engines relatively inexpensively in addition to supplying such a control system on OEM engines.

SUMMARY OF THE INVENTION

According to one aspect of the invention, there is provided a control system for a natural gas engine, said control system comprising an air/fuel throttle valve operable to be associated with a carburetor, a fuel valve having non-linear fuel flow response as said fuel valve is opened and closed, said fuel valve being located upstream of said carburetor and associated with the supply of fuel to said carburetor from a fuel source, and a flow compensator to compensate for said non-linear flow of fuel passing through said fuel valve as said fuel valve is opened and closed.

According to a further aspect of the invention, there is provided a method of controlling a natural gas engine, said method comprising the steps of opening and closing an air/fuel throttle valve associated with a carburetor, opening and closing a fuel valve upstream of said carburetor to vary the supply of fuel from a fuel source to said carburetor, said fuel valve having a non-linear fuel flow response as said fuel valve is opened and closed and compensating for said non-linear fluid flow response passing through said fuel valve as said fuel valve is opened and closed.

According to yet a further aspect of the invention, there is provided a control system for a natural gas engine which engine includes a turbo charger and an oxygen sensor associated with said engine to sense the quantity of oxygen in the exhaust from said engine, a fuel valve which opens and closes to admit and restrict fuel to said engine and an air/fuel throttle valve which opens and closes to admit or restrict the air/fuel mixture to said engine, said control system comprising a sensor to sense the position of said air/fuel throttle valve and to pass an air/fuel throttle valve position sensor signal to a controller, said controller comparing said air/fuel throttle valve position sensor signal with a predetermined user set point and outputting a signal associated with said comparison, said output signal operably opening or closing a waste gate valve used in association with said turbo charger thereby to increase or decrease the pressure of air compressed by said turbo charger.

According to still yet a further aspect of the invention, there is provided a method of controlling a natural gas engine with a turbo charger and an oxygen sensor associated with said engine to sense the quantity of oxygen in the exhaust from said engine, said method comprising sensing the position of an air/fuel throttle valve associated with said engine and passing a position signal to a controller, comparing said position signal with a predetermined user set point and providing a output signal as a result of said comparison, opening and/or closing a waste gate valve associated with said turbo charger thereby increasing or decreasing the pressure of air compressed by said turbo charger.

According to still yet a further aspect of the invention, there is provided an air/fuel throttle valve for an engine, said air/fuel throttle valve being operably controlled by a governor which governor electronically controls the opening and closing of said throttle valve, a controller to sense the speed of said engine and to compare said engine speed with a predetermined user set point and a compensator to compensate for said opening and closing of said throttle valve associated with non-linear air/fuel flow response during said opening and closing of said throttle valve.

According to yet a further aspect of the invention, there is provided a method of controlling the opening and closing of an air/fuel throttle valve associated with an engine, which air/fuel throttle valve has a non-linear air/fuel flow response as it opens and closes, said method comprising sensing the speed of said engine, comparing said engine speed with a predetermined user set point and compensating for said non-linear air/flow response of said air/fuel throttle valve.

According to a further aspect of the invention, there is provided a control system for a natural gas engine having a carburetor and an oxygen sensor to measure the quantity of oxygen in the exhaust from said engine, said control system comprising a fuel valve upstream of said carburetor, said oxygen sensor controlling the ratio of air to fuel supplied to said engine by said carburetor.

According to yet a further aspect of the invention, there is provided a method of controlling a natural gas engine, said method comprising sensing the quantity of oxygen in the exhaust from said engine with an oxygen sensor and utilising said oxygen sensor to control the ratio of air to fuel supplied to said engine by a carburetor.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1:
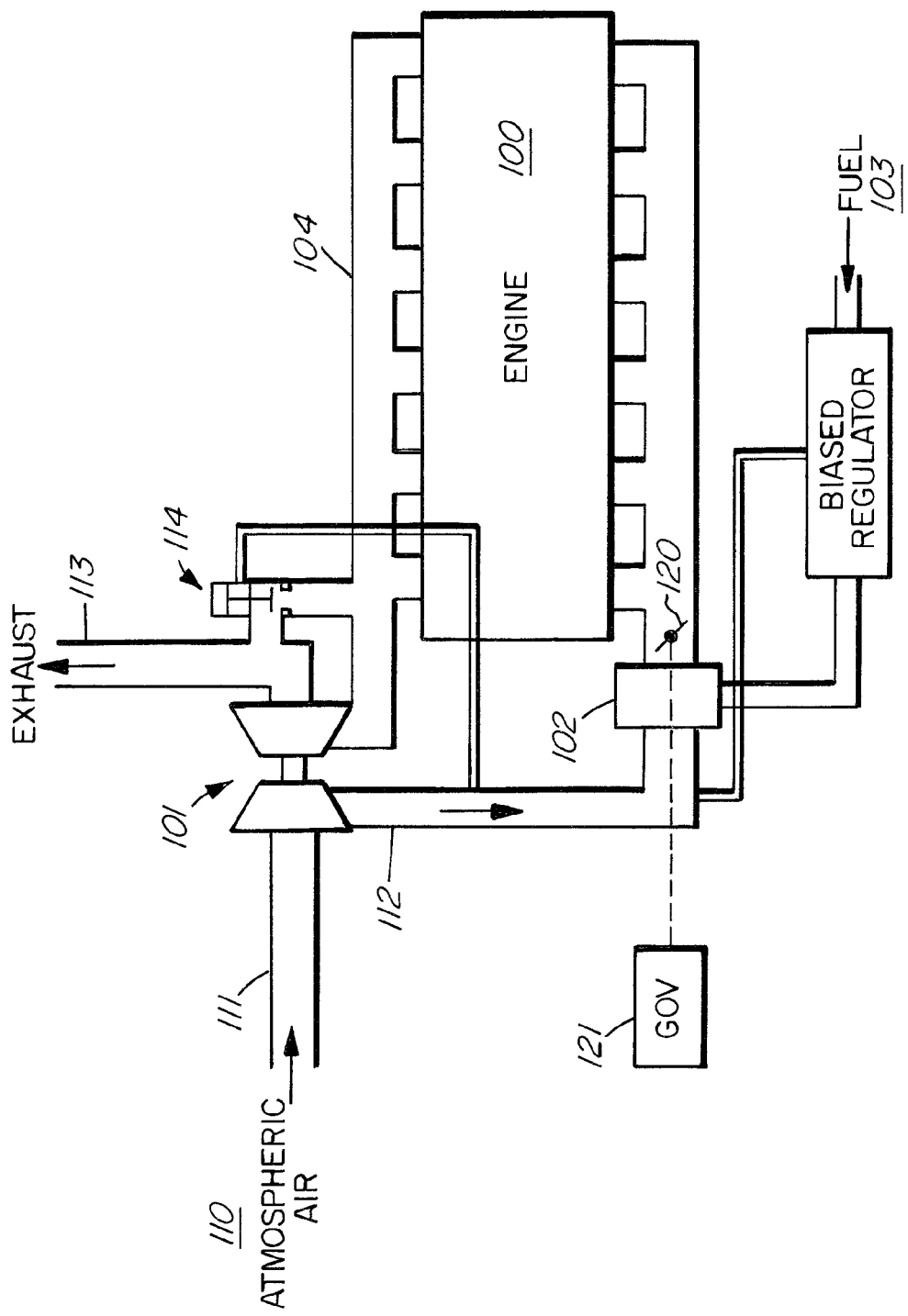
FIG. 1 is a diagrammatic schematic illustrating a control system for a natural gas engine which utilises air compressed by the turbo charger for waste gate control according to the PRIOR ART.

Referring now to the drawings, a natural gas turbo charged carbureted engine is illustrated generally at 100 in FIG. 1, with its turbo charger being generally illustrated at 101 and its carburetor being generally shown at 102. The natural gas fuel source 103 provides the natural gas used as fuel which enters the engine 100 through carburetor 102.

The turbo charger 101 is powered by the hot exhaust gases leaving the engine 100 through exhaust manifold 104. The turbo charger 101 uses atmospheric air 110 which enters the turbo charger 101 through duct 111. The air is compressed by the turbo charger 101 and leaves the turbo charger 101 through duct 112 which duct 112 provides the compressed air to the carburetor 102.

The hot gases passing to the turbo charger 101 from exhaust manifold 104 leave the turbo charger 101 and are exhausted to the atmosphere through exhaust duct 113. A waste gate generally illustrated at 114 may be used to reduce the volume of hot engine gases entering the turbo charger 101 by bypassing a portion of the hot engine gases from passing through turbo charger 101.

An air/fuel throttle valve 120 is associated with the carburetor 102. Throttle valve 120 is generally in the form of a butterfly valve and is conveniently operated by a governor 121 which runs off the engine rpm. If the engines rpm falls, the governor 121 instructs the throttle valve 120 to open to a greater position thereby admitting more air-fuel mixture to engine 100 and if the engine rpm increases, the governor 121 instructs the throttle valve 120 to move to a more closed position thereby restricting air-fuel flow to the engine 100. This is known technology and part of the prior art as indicated in FIG. 1.

Figure 2A:
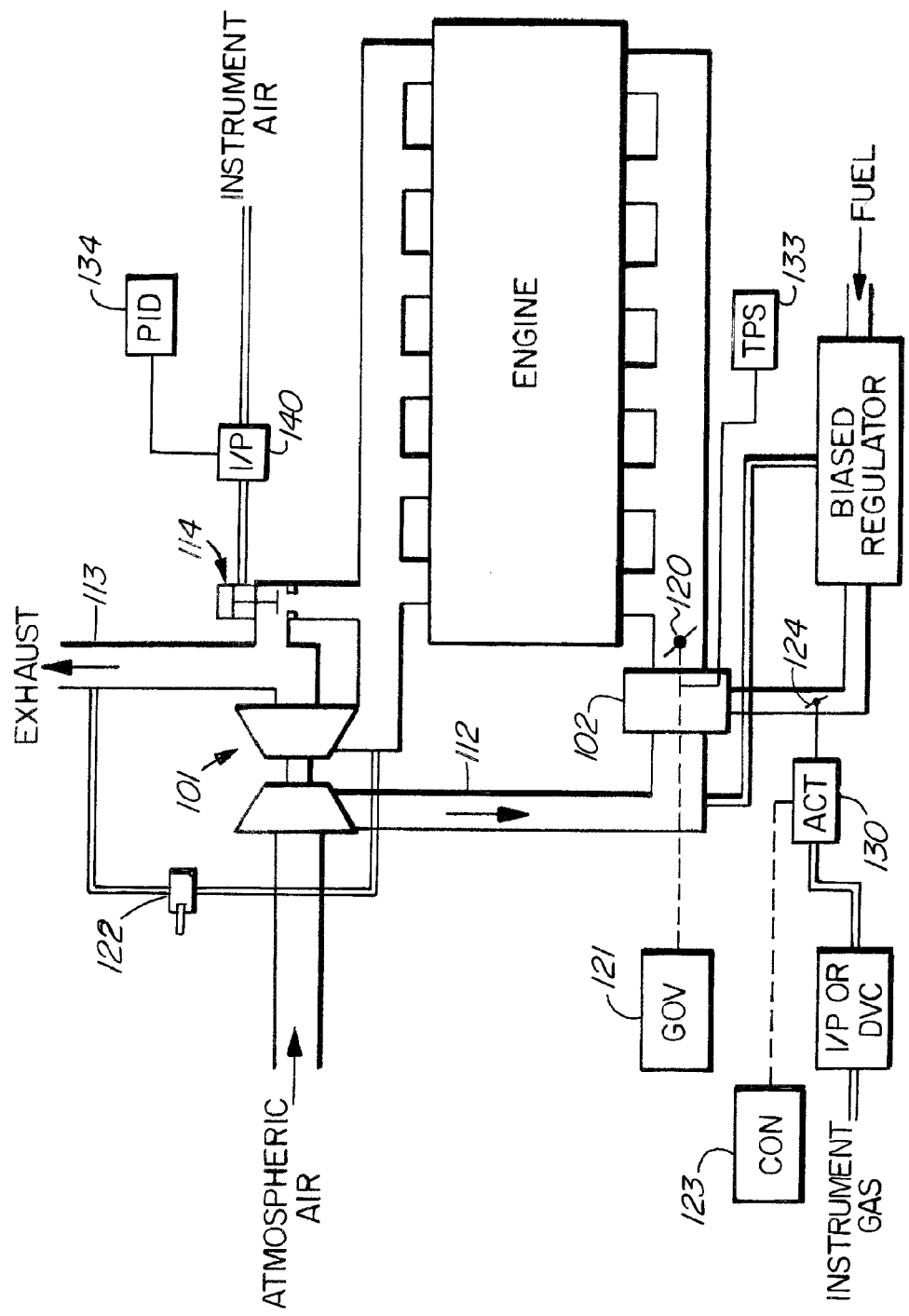
FIG. 2A is a diagrammatic view illustrating a control system incorporated into a natural gas engine and which particularly illustrates a butterfly type fuel valve according to a first embodiment of the invention.

Referring to FIG. 2A, a fuel flow valve 124 is used to admit the natural gas fuel to the carburetor 102. An oxygen sensor (UEGO) 122 is mounted so as to measure the oxygen in the exhaust duct 113 and a controller 123 measures the output of the oxygen sensor 122 and a user set point which is close to or at the optimum oxygen/fuel ratio. The controller 123 will accordingly provide a change in position for the fuel flow valve 124 to either admit more or less fuel to the carburetor 102 based on the optimum value of oxygen in the exhaust as measured by the oxygen sensor 122.

Figure 2B:
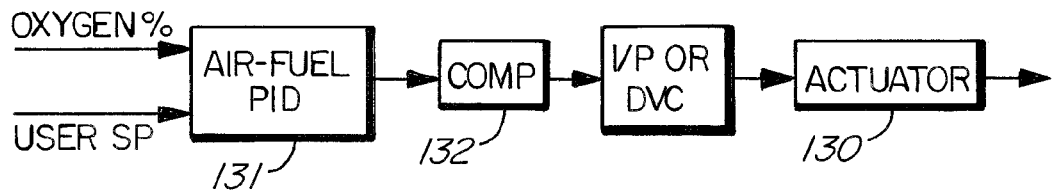
FIG. 2B is a diagrammatic flow chart illustrating the proportional integral derivative (PID) controller, a compensator and an actuator for the fuel valve used in the control system of FIG. 1A.
Figure 5A:
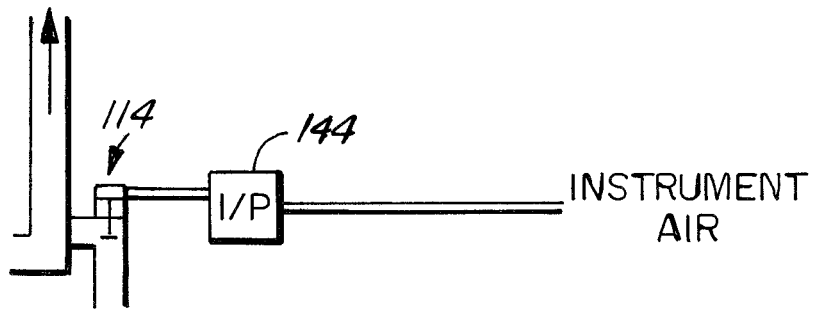
FIG. 5A is a diagrammatic schematic of an alternative pressure control for the waste gate illustrating control pressure applied above the diaphragm of the waste gate.
Figure 5B:
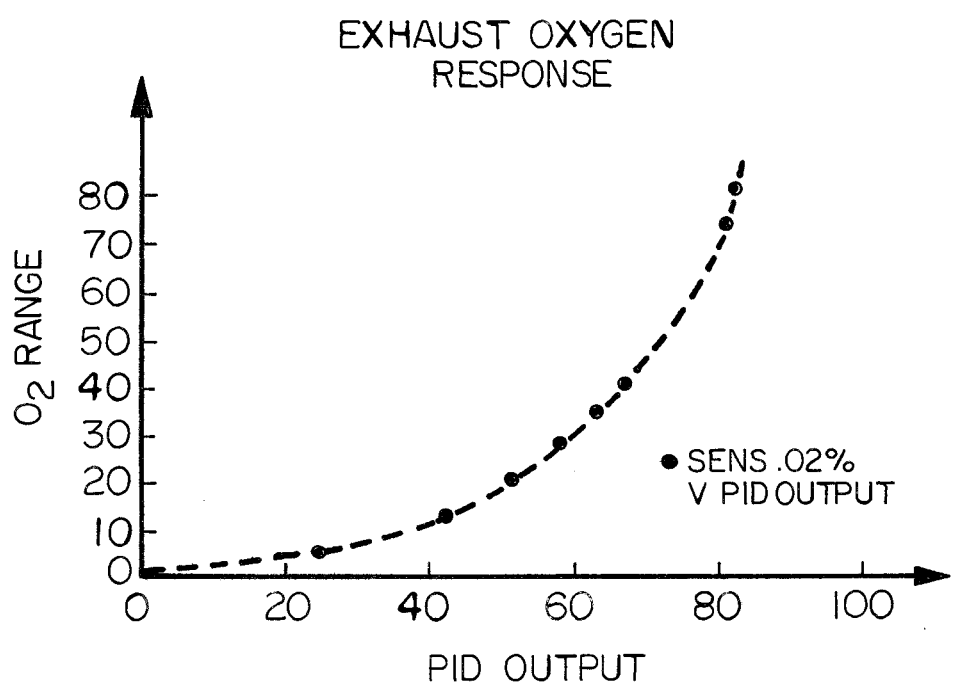
FIG. 5B illustrates the non-linear exhaust oxygen response for a butterfly type valve used for gas flow control.

The fuel flow valve 124 conveniently takes the form of a butterfly type valve and is controlled by actuator 130. Butterfly valves are useful since they are simple in operation and inexpensive. Reference is made to FIG. 5B where PID output is a function of the percentage of oxygen in the exhaust. However, there are non-linearities associated with butterfly type valves as it is apparent that such valves have non-linear flow changes as the valve opens and closes. This non-linear valve characteristic output makes it difficult to adjust the controller to give a fast response for all outputs. To enhance the operation of the valve 124, a proportional integral derivative (PID) controller 131 (FIG. 2B) is located upstream from the actuator 130 and a flow compensation algorithm is incorporated in a compensator 132 located between the controller 131 and the actuator 130.

For the same reasons described above in association with fuel flow valve 124, the air/fuel throttle valve 120 (FIG. 2A) suffers from non-linear fuel flow when the throttle valve 120 is opened and closed. When the governor 121 (FIG. 2A) is of the mechanical type, a throttle position sensor 133 is operably connected to the throttle valve 120 in order that the angle position of the throttle valve 120 can be measured and recorded. A second PID controller 134 obtains this position of the throttle valve 120 from throttle position sensor 133 and determines the difference between such position and an optimum and predetermined set point as entered into the controller 134.

The output of the controller 134 will then reflect this difference. The controller 134 is operably connected to the waste gate 114 by way of a pressure transducer 140. The controller 134 and pressure transducer 140 will thereby open and close the waste gate valve 101 thereby increasing or decreasing the pressure of the compressed air leaving turbo charger 101 and entering carburetor 102 through duct 112. Thus, the air/fuel throttle valve 120 is under the direction of the controller 134 which allows the governor 121 to operate in a more limited range for which the governor 121 may be more precisely turned.

Figure 3B:
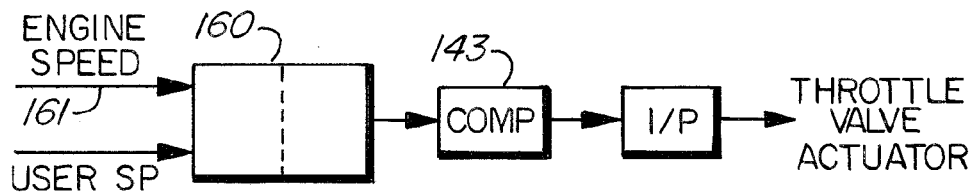
FIG. 3B is a diagrammatic flow chart illustrating a proportional integral derivative (PID) controller with a compensating algorithm which generates the actuator of the air/fuel throttle valve used with the control system of FIG. 2A.
Figure 3C:
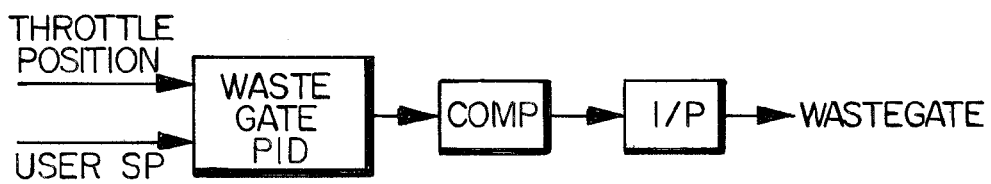
FIG. 3C is a diagrammatic flow chart illustrating a waste gate PID used with the throttle position sensor used for actuator control.
Figure 3A:
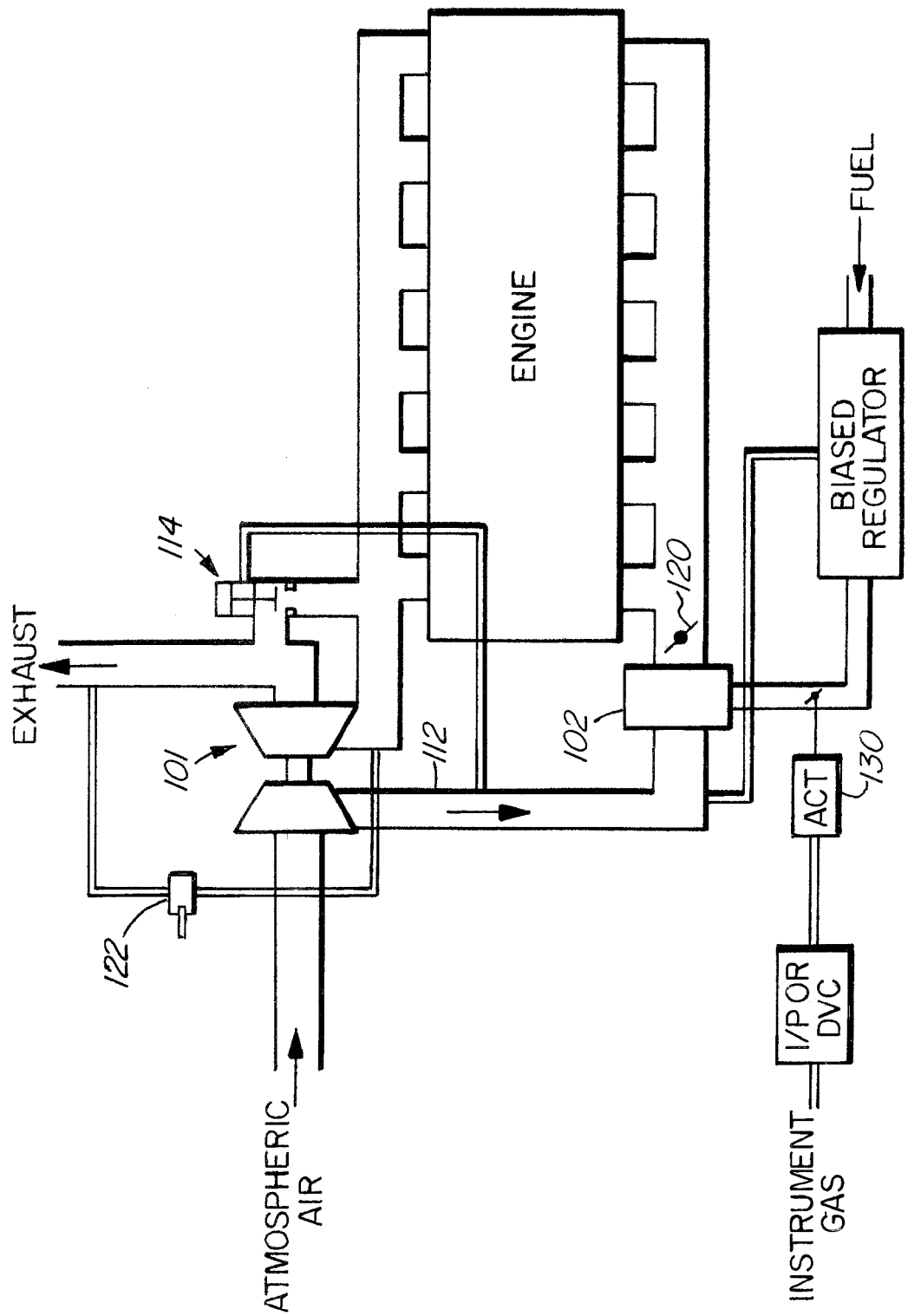
FIG. 3A is a diagrammatic schematic illustrating a control system installed on a natural gas engine according to a further aspect of the invention and particularly illustrating an oxygen sensor used for compensating and controlling the fuel valve.

A further aspect of the invention relates to engines which utilise a governor 142 which is electronically controlled as opposed to being mechanically controlled and reference is made to FIG. 3B where the waste gate control system described in association with FIG. 2A and which is associated with throttle position sensor 133 is not required. A PID controller 160 operably connected with the engine speed sensor 161 will change the output of the controller 160. A flow compensation algorithm is incorporated in a compensator 143 and will correct for the inherent non-linear flow characteristics of the throttle valve 120 which will allow optimum tuning of the controller 160 and therefore the throttle valve 120. The compensator 143 effectively inverses the non-linear action of the air/fuel throttle valve 120 so that a substantially linear response is similar to the oxygen-PID output curve illustrated in FIG. 5B.

Figure 4:
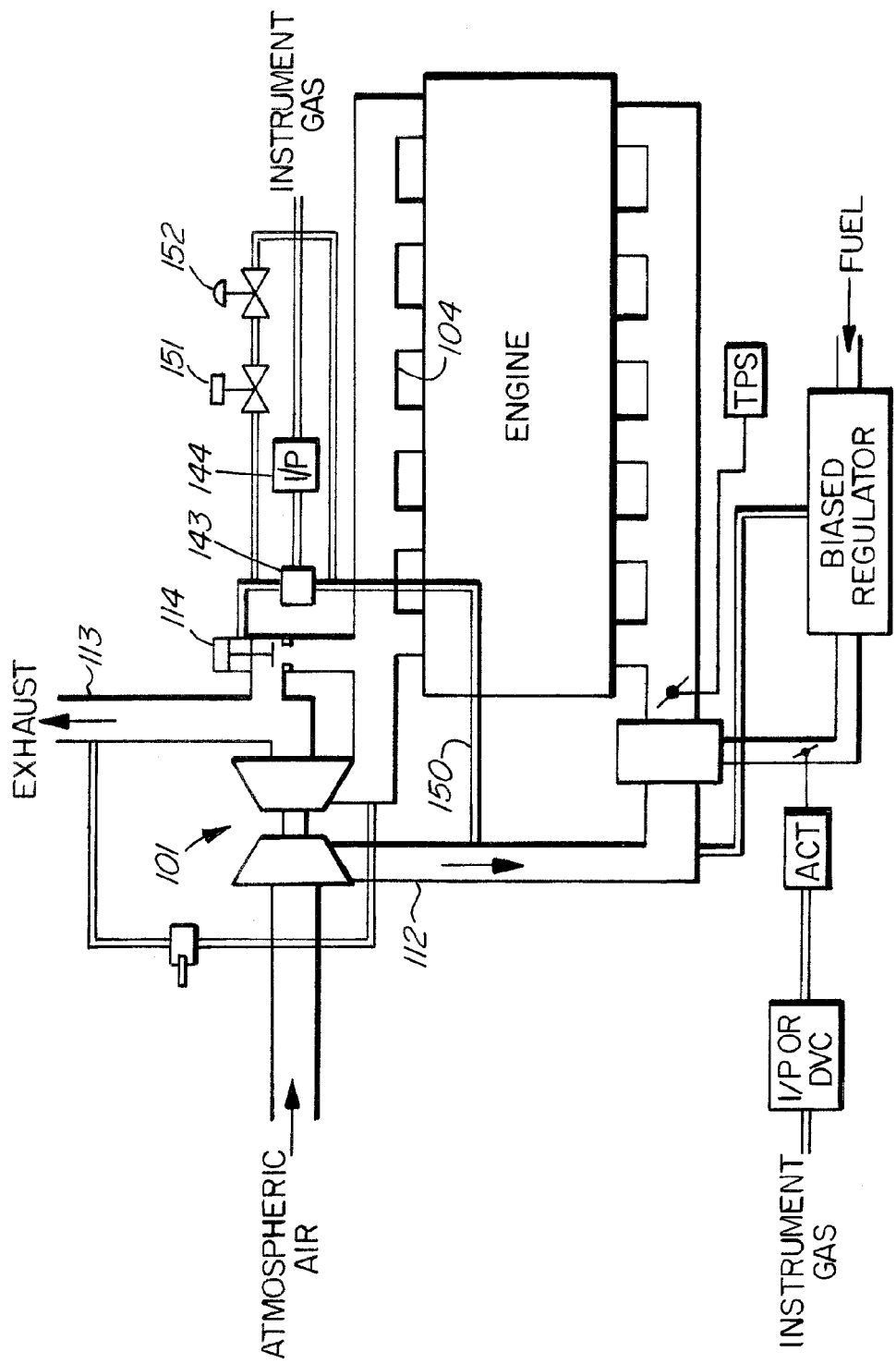
FIG. 4 is a diagrammatic schematic illustrating a waste gate control and bypass arrangement used when instrument gas may be present in the vicinity of the hot exhaust gases emanating from the turbo charger according to a further aspect of the invention.

A further aspect of the invention relates to the use of instrument gas being used for pneumatic devices instead of instrument air. Instrument gas is commonly pressurized natural gas and it is desirable to isolate this gas from the hot exhaust gases emanating from the turbo charger 101. Reference is made to FIG. 4 where a pneumatic relay 143 is used. The relay 143 is controlled by the instrument gas acting on the pressure transducer 144. If it desired to open the waste gate 114, relay 143 will be activated by pressure transducer 144 which will allow the compressed air in duct 112 to travel through line 150 to relay 143 and thence to the waste gate 114 where it will open the waste gate 114 and allow a portion of the exhaust in the exhaust manifold 104 to escape directly to the exhaust stack 113 without driving the turbo charger 101 so that the speed of the turbo charger 101 will be reduced which will, in turn, reduce the pressure of the compressed air in duct 112.

In the event of failure of the control system, apparatus may conveniently be used to return the waste gate control to that of the original system.

Reference is again made to FIG. 4 where default equipment is added to the circuit by way of a solenoid valve 151 which opens in the event of a control system failure. A pressure regulator 152 may also be provided to reduce the pressure in line 150 if required.

Opening the solenoid valve 151 will allow the compressed air in duct 112 and line 150 to be applied to the waste gate 114 directly.

Many modifications will readily occur to those skilled in the art to which the invention relates and the specific embodiments herein described should be taken as illustrative of the invention only and not as limiting its scope as defined in accordance with the accompanying claims.

We claim:

1. A method of controlling a natural gas engine system having a turbo charger having a compressor and a turbine connected to said natural gas engine; a turbine wastegate valve; an oxygen sensor associated with said natural gas engine to sense a quantity of oxygen in exhaust gas discharged from said natural gas engine; an air/fuel throttle valve; a fuel valve positioned upstream of said air/fuel throttle valve; a position sensor to sense the position of said air/fuel throttle valve; and a PID controller; said method comprising:
    sensing an air/fuel throttle valve position;
    comparing said position signal with a predetermined user set point via said PID controller;
    actuating said waste gate valve in response to an output signal as a result of said comparing said position signal with a predetermined user set point to regulate compressed air pressure in an intake duct.

2. A control system for a natural gas engine comprising:
a turbo charger having a compressor and a turbine connected to said natural gas engine;
a wastegate valve bypassing exhaust gas around said turbine;
an oxygen sensor associated with said natural gas engine to sense a quantity of oxygen in exhaust gas discharged from said natural gas engine;
an air/fuel throttle valve;
a fuel valve positioned upstream of said air/fuel throttle valve to adjust fuel being distributed into an air intake duct to form a compressed air/fuel mixture;
    wherein said air/fuel throttle valve adjusts the compressed air/fuel mixture being delivered into said natural gas engine;
a position sensor to sense the position of said air/fuel throttle valve; and
a PID controller,
    wherein said PID controller is to
        receive a signal from said air/fuel throttle valve position sensor;
        compare the signal from said air/fuel throttle valve position sensor to a predetermined user set point;
        output a signal associated with said comparing the signal from said air/fuel throttle valve position sensor to a predetermined user set point; and
        actuate said waste gate valve in response to said outputting a signal associated with said comparing the signal from said air/fuel throttle valve position sensor to a predetermined user set point thereby to regulate compressed air pressure in said air intake duct.

* * * * *